(12) United States Patent
Chu et al.

(10) Patent No.: US 8,908,474 B2
(45) Date of Patent: Dec. 9, 2014

(54) INVERSION OF 4D SEISMIC DATA

(75) Inventors: Dez Chu, Bellaire, TX (US); Grant A. Gist, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1005 days.

(21) Appl. No.: 12/593,475

(22) PCT Filed: Mar. 24, 2008

(86) PCT No.: PCT/US2008/003830
§ 371 (c)(1),
(2), (4) Date: Feb. 15, 2010

(87) PCT Pub. No.: WO2008/140655
PCT Pub. Date: Nov. 20, 2008

(65) Prior Publication Data
US 2010/0142323 A1    Jun. 10, 2010

Related U.S. Application Data (60) Provisional application No. 60/928,480, filed on May 9, 2007.

(51) Int. Cl.
*G01V 1/28* (2006.01)
*G01V 11/00* (2006.01)

(52) U.S. Cl.
CPC .......... *G01V 11/00* (2013.01); *G01V 2210/665* (2013.01)
USPC ........................................................ 367/73

(58) Field of Classification Search
CPC .......................... G01V 2210/665; G01V 11/00
USPC .............. 367/28, 29, 73; 382/159; 702/13, 14
See application file for complete search history.

(56) References Cited

U.S. PATENT DOCUMENTS

| | | | |
|---|---|---|---|
| 3,921,126 A | 11/1975 | Waters | |
| 4,969,130 A | 11/1990 | Wason et al. | ................... 367/73 |
| 5,018,112 A | 5/1991 | Pinkerton et al. | |

(Continued)

FOREIGN PATENT DOCUMENTS

| | | | | |
|---|---|---|---|---|
| WO | WO03/065013 | 8/2003 | ............... | G01N 1/00 |
| WO | WO2006/054181 | 5/2006 | ............... | G01V 1/30 |
| WO | WO2009/027420 | 3/2009 | ............... | G01V 1/30 |

OTHER PUBLICATIONS

Hoversten, G.M. et al. (2006). "Direct reservoir parameter estimation using joint inversion of marine seismic AVA and CSEM data", Geophysics, v. 71(3), pp. C1-C-13.

(Continued)

*Primary Examiner* — Daniel L Murphy
(74) *Attorney, Agent, or Firm* — ExxonMobil Upstream Research Company Law Dept.

(57) ABSTRACT

The invention is a method for inferring the saturation and pressure change of a reservoir by combining the information from 4D (time-lapse) seismic and time lag data volumes (7) derived from the 4D seismic, well logs (4), and reservoir simulation results (when simulator results are available) and featuring one or more 4D well ties (1) for a quantitative 4D interpretation. The inventive method uses model-based inversion incorporating rock physics (2) at well locations (5), and is statistical-based (6) away from wells. The method thus allows integration (8) of rock physics model and reservoir simulation and honors 4D seismic change.

17 Claims, 4 Drawing Sheets

(56) References Cited

U.S. PATENT DOCUMENTS

| | | | |
|---|---|---|---|
| 5,148,406 A | | 9/1992 | Brink et al. |
| 5,444,619 A | * | 8/1995 | Hoskins et al. ................ 702/13 |
| 5,586,082 A | | 12/1996 | Anderson et al. ............... 367/73 |
| 5,796,678 A | | 8/1998 | Pisetski |
| 5,798,982 A | | 8/1998 | He et al. |
| 5,831,935 A | | 11/1998 | Luo et al. |
| 5,870,690 A | | 2/1999 | Frenkel et al. |
| 5,873,051 A | | 2/1999 | Van Bemmel et al. ......... 702/17 |
| 5,878,372 A | | 3/1999 | Tabarovsky et al. ............. 702/7 |
| 5,905,657 A | | 5/1999 | Celniker ....................... 364/578 |
| 5,986,974 A | | 11/1999 | Luo et al. |
| 6,028,820 A | | 2/2000 | Pisetski |
| 6,041,018 A | | 3/2000 | Roche ............................ 367/46 |
| 6,057,561 A | | 5/2000 | Kawasaki et al. |
| 6,125,330 A | | 9/2000 | Robertson et al. .............. 702/14 |
| 6,266,619 B1 | | 7/2001 | Thomas et al. ................. 702/13 |
| 6,317,384 B1 | | 11/2001 | Luo et al. |
| 6,356,844 B2 | | 3/2002 | Thomas et al. ................. 702/12 |
| 6,374,201 B1 | | 4/2002 | Grizon et al. |
| 6,389,361 B1 | | 5/2002 | Geiser |
| 6,438,069 B1 | | 8/2002 | Ross et al. ...................... 367/73 |
| 6,498,989 B1 | | 12/2002 | Pisetski et al. |
| 6,529,833 B2 | | 3/2003 | Fanini et al. ...................... 702/7 |
| 6,574,563 B1 | | 6/2003 | Nickel et al. ................... 702/14 |
| 6,614,717 B1 | | 9/2003 | Khan et al. ...................... 367/46 |
| 6,694,263 B2 | | 2/2004 | Fournier et al. |
| 6,715,551 B2 | | 4/2004 | Curtis et al. ............. 166/250.16 |
| 6,778,918 B2 | | 8/2004 | Delhomme et al. |
| 6,801,858 B2 | | 10/2004 | Nivlet et al. .................... 702/14 |
| 6,826,483 B1 | | 11/2004 | Anderson et al. ............... 702/13 |
| 6,853,921 B2 | | 2/2005 | Thomas et al. ................. 702/14 |
| 6,904,368 B2 | | 6/2005 | Reshef et al. |
| 6,906,982 B2 | | 6/2005 | Calvert ........................... 367/21 |
| 6,980,940 B1 | | 12/2005 | Gurpinar et al. ................ 703/10 |
| 6,985,404 B2 | | 1/2006 | Mallick ........................... 367/47 |
| 6,989,841 B2 | | 1/2006 | Docherty |
| 7,027,354 B2 | | 4/2006 | Cole et al. ....................... 367/73 |
| 7,079,952 B2 | | 7/2006 | Thomas et al. ................. 702/13 |
| 7,242,637 B2 | | 7/2007 | Van Den Beukel et al. .... 367/38 |
| 7,247,637 B2 | | 7/2007 | Van Den Beukel et al. |
| 7,355,923 B2 | | 4/2008 | Reshef et al. |
| 7,456,113 B2 | | 11/2008 | Rayandayan et al. |
| 7,478,024 B2 | | 1/2009 | Gurpinar et al. ................ 703/10 |
| 7,523,003 B2 | | 4/2009 | Robertsson et al. ............ 702/14 |
| 7,577,061 B2 | | 8/2009 | Williamson et al. |
| 7,620,534 B2 | | 11/2009 | Pita et al. |
| 7,660,711 B2 | | 2/2010 | Pita et al. |
| 2003/0043693 A1 | | 3/2003 | Eastwood et al. .............. 367/41 |
| 2006/0153005 A1 | | 7/2006 | Herwanger et al. ............. 367/38 |
| 2007/0005253 A1 | | 1/2007 | Fornel et al. .................... 702/14 |
| 2007/0156377 A1 | | 7/2007 | Gurpinar et al. ................ 703/10 |
| 2007/0255500 A1 | | 11/2007 | Pita et al. ........................ 702/11 |
| 2007/0255545 A1 | | 11/2007 | Pita et al. ........................ 703/10 |
| 2008/0004847 A1 | | 1/2008 | Bradford ......................... 703/10 |
| 2008/0033656 A1 | | 2/2008 | Herwanger ...................... 702/18 |
| 2008/0170468 A1 | | 7/2008 | Brain et al. ...................... 367/38 |
| 2008/0195358 A1 | | 8/2008 | El Ouair et al. .................. 703/2 |
| 2008/0288226 A1 | | 11/2008 | Gurpinar et al. ................ 703/10 |
| 2008/0291781 A1 | | 11/2008 | Williamson et al. ............ 367/38 |
| 2010/0254217 A1 | | 10/2010 | Chu et al. |

OTHER PUBLICATIONS

International Preliminary Report on Patentatibility, dated Mar. 18, 2010, PCT/US08/03830.
Ribeiro, C. et al. (2004), "A Petroelastic-Based Approach to Pressure and Saturation Estimation Using 3D Seismic", Exp. Abstracts: 74th Annual Meeting of the SEG, 4 pgs.
Rickett, J. et al. (2006), "Compacting and 4D Time Strain at the Genesis Field", Expanded Abstracts: 76th Annual Meeting of the SEG, pp. 3215-3219.
Sarka, S. et al. (2003), "On the Inversion of Time-Lapse Seismic Data," *SEG*, 4 pgs.
Sonneland, L. et al. (1997), "Seismic reservoir monitoring on Gullfaks", XP-002187538, *The Leading Edge*, 6 pgs.
Stolt, R. et al. (1985), "Migration and Inversion of Seismic Data", *Geophysics* 50, pp. 2458-2472.
Tura, A. et al. (1998), "Subsurface Fluid Flow Properties from Time-Lapse Elastic Wave Reflection Data", Proceedings of SPIE, Mathematical Methods in Geophysical Imaging V, v. 3453, pp. 125-138.
Vasco, D.W. (2004), "Seismic imaging of reservoir flow properties: Time-lapse pressure changes", XP-002445689, *Geophysics* 69(2), pp. 511-521.
Veire, H.H. et al. (2006), "Stochastic Inversion of pressure and saturation changes from time-lapse AVO data", XP-001249687, *Geophysics* 71(5), pp. C81-C92.
European Search Report, dated Aug. 6, 2007, RS 115507.
European Search Report, dated May 31, 2010, EP 08 72 7108.
International Search Report and Written Opinion, dated Jun. 11, 2008, PCT/US2008/003830.
Aki and Richards (1980) *Quantitative Seismology*, pp. 123-188.
Angelov, P. et al. (2004) "Pore Pressure and Water Saturation Variations—Modification of Landro's AVO Approach," *Expanded Abstracts: 74th Annual Meeting of the SEG*, 4 pgs.
Bachrach, et al. (2004) "Joint Estimation of Porosity and Saturation and of Effective Stress and Saturation for 3D and 4D Seismic Reservoir Characterization Using Stochastic Rock Physics Models and Bayesian Inversion," *Expanded Abstracts: 74th Annual Meeting of the SEG*, 4 pgs.
Emerge (http://www.veritasdgc.com/vhr/bins/index.asp), 110 pgs.
Floricich, M. et al. (2005) "An Engineering-Driven Approach for Separating Pressure and Saturation Using 4D Seismic: Application to a Jurassic Reservoir in the UK North Sea," Expanded Abstracts: 75th Annual Meeting of the SEG, pp. 2464-2468.
Hatchell, P. et al. (2005) "Measuring Reservoir Compaction Using Time-Lapse Timeshifts, Expanded Abstracts," 75th Annual Meeting of the SEG, pp. 2500-2504.
Hudson, T. et al. (2005) "Genesis Field, Gulf of Mexico, 4-D Project Status and Preliminary Lookback," 75th Annual Meeting of the SEG, pp. 2436-2440.
Janssen, A. et al. (2006) "Measuring Velocity Sensitivity to Production-Induced Strain at the Ekofisk Field Using Time-Lapse Time-Shifts and Compaction Logs," Expanded Abstracts: 76th Annual Meeting of the SEG, pp. 3200-3204.
Landro, M. (2001) "Discrimination Between Pressure and Fluid Saturation Changes From Time-Lapse Seismic Data," *Geophysics* 66, pp. 836-844.
Lumley, D. et al. (2003) "Estimation of Reservoir Pressure and Saturations by Crossplot Inversion of 4D Seismic," SEG, 4 pages.

* cited by examiner

FIG. 4

INVERSION OF 4D SEISMIC DATA

CROSS-REFERENCE TO RELATED APPLICATIONS

This application is a National Stage entry under 35 U.S.C. 371 of PCT/US2008/003830 that published as WO 2008/140655 and was filed on Mar. 24, 2008 and claims the benefit of U.S. Provisional application 60/928,480 which was filed on May 9, 2007.

FIELD OF THE INVENTION

This invention relates generally to the field of hydrocarbon reservoir analysis, and more particularly to time-lapse seismic analysis. Specifically, the invention is a method for inversion of 4D seismic data to predict fluid and pressure change.

BACKGROUND OF THE INVENTION 4D seismic, sometimes called time-lapse seismic, is a term that refers to performing an initial, or base, seismic survey of a subsurface region, then performing at least one later, or monitor, survey of the same region, attempting to duplicate the acquisition parameters and conditions as closely as possible. This enables comparison of seismic images of the subsurface over intervals of months or years of time to detect changes due to production of hydrocarbons or injection of fluids. More generally, the term base survey may refer to any survey performed earlier in time than the survey referred to as the monitor survey; i.e., the base survey may refer to an earlier monitor survey. 4D seismic is the only field-wide history match constraint for theoretical predictions of such changes by elaborate software modeling programs called reservoir simulators. Currently, one compares simulator results and 4D seismic data by comparing synthetic seismic data modeled using the simulator to measured 4D seismic difference data; alternatively, acoustic impedance (the product of density and acoustic velocity) modeled using a simulator is compared to inverted impedance, i.e. impedance (as a function of subsurface spatial location) inferred by inversion of seismic data, if inversion has been done. Ideally, the simulator model will be adjusted, or updated, using reservoir properties derived from quantitative 4D, i.e. saturation change and pressure change over time. Data volumes of saturation and pressure change values as a function of subsurface location will reduce the uncertainties in 4D interpretations.

4D seismic is impacted by fluid movement and pressure changes. Production of hydrocarbons resulting in fluid saturation changes in the subsurface will change the acoustic velocity in those regions. Traveling at a different speed (compared to an earlier survey), the reflected seismic wave will arrive at surface detectors sooner or later than in the base survey. This will not only change the strength (amplitude) of the seismic signal, but also shift the apparent depth of reflecting interfaces in resulting seismic images. Moreover, unless pressure is maintained in the reservoir by fluid injection, the reflectors themselves can move downward, which is called subsidence or compaction. However, to quantify the fluid movement and pressure change from the amplitude change of seismic signal, one has to take the rock frame into consideration. Unfortunately, uncertainties in rock parameter estimations (i.e. shale volume vsh and porosity Φ) from seismic can be overwhelming relative to fluid and pressure change signals.

Most current technologies for deriving saturation and pressure change use transformations of variations of 4D AVO attributes (quantities calculated from seismic amplitude vs. source-receiver separation, or offset, data), notably A+B and A−B or $I_P$ and $I_S$. (Data for amplitude vs. offset may be subjected to a best linear fit, i.e. y=A+Bx, in which case the parameters A and B are AVO attributes; $I_P$ and $I_S$ represent acoustic impedance, i.e. the products of density and acoustic wave propagation velocities for the P-wave and S-wave.) Using different forms of approximations of the reflectivity equation (see Aki and Richards, *Quantitative Seismology* 123-188 (1980)) and a rock physics model, a set of coefficients can be estimated to make a combination of near and far difference amplitudes to infer the saturation and pressure change. See, for example, Landro, "Discrimination between pressure and fluid saturation changes from time-lapse seismic data," *Geophysics* 66, 836-844 (2001). This type of formulation works well when physical properties (i.e. vsh and phi) within the reservoir are relatively constant. For a multi-cycle reservoir, side-lobe energy (caused by an input signal such as that from vibroseis for land or airgun for marine being bandwidth limited) may generate apparent difference events that can appear as real reservoir differences. This side-lobe energy complicates interpretation of multi-cycle reservoirs where there is interference between reflectors.

Map-based calibration of production data to 4D seismic data has been seen at SEG conventions (Floricich et al., "An engineering-driven approach for separating pressure and saturation using 4D seismic: application to a Jurassic reservoir in the UK North Sea," Expanded Abstracts: 75th Annual Meeting of the SEG (2005)). Floricich uses production data (pressure and saturation measurements) at well locations and calibrates each quantity with 4D seismic attributes to derive a map. This method is purely statistical. It does not deal with the vertical distribution of saturation and pressure change.

Time shifts are commonly used for detecting reservoir compaction. The term time shift, or time lag, refers to comparison of time-lapse seismic data and determining the arrival time correction needed to align the subsurface structure in the later seismic data set with that of the earlier data. See, for example, Hudson et al., "Genesis field, Gulf of Mexico, 4-D project status and preliminary lookback," 75th Annual Meeting of the SEG (2005); and Hatchell et al., "Measuring reservoir compaction using time-lapse timeshifts, Expanded Abstracts," 75th Annual Meeting of the SEG (2005).

Production will cause the pressure to decrease within the reservoir. If the pressure of the reservoir is not well maintained, compaction of the reservoir will occur, especially for younger rocks. This compaction will most likely be coupled with subsidence of the overburden and overburden dilation. A time-shift data volume can be used to quantify such effects by looking at the time shifts at different time/depth levels.

Most recently, at the 2006 SEG meeting, Rickett et al. (2006) and Janssen et al. (2006) used time shifts to estimate the strain caused by production. (Rickett et al., "Compacting and 4D time strain at the Genesis Field," and Janssen et al., "Measuring velocity sensitivity to production-induced strain at the Ekofisk Field using time-lapse time-shifts and compaction logs," both papers in Expanded Abstracts: 76th Annual Meeting of the SEG (2006)) Jansen showed that taking the first derivative of the time shifts enables interpreters to interpret time shifts in a manner similar to interpreting 4D difference volumes. Veire et al. disclose a stochastic model for estimation of pressure and saturation changes from time-lapse seismic AVO data within a Bayesian framework. ("Stochastic Inversion of Pressure and Saturation Changes From Time-Lapse AVO Data," *Geophysics* 71, C81-C92 (2006))

SUMMARY OF THE INVENTION

In one embodiment, the invention is a method for inversion of time-lapse (4D) seismic data (a base survey and a later monitor survey of the same subsurface formation) to estimate the change in fluid saturation and reservoir pressure from the time of the base survey to the time of the monitor survey, comprising:

(a) inverting the 4D seismic data at least one well location to directly obtain formation pressure change and fluid saturation change for at least one formation fluid, constraining the inversion with well log data; and (b) using the saturation and pressure change from at least one well location to obtain saturation and pressure change away from well locations, thereby generating a well-tied fluid saturation and pressure change model predicting change of fluid saturation from the time of the base survey to the time of the monitor survey.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
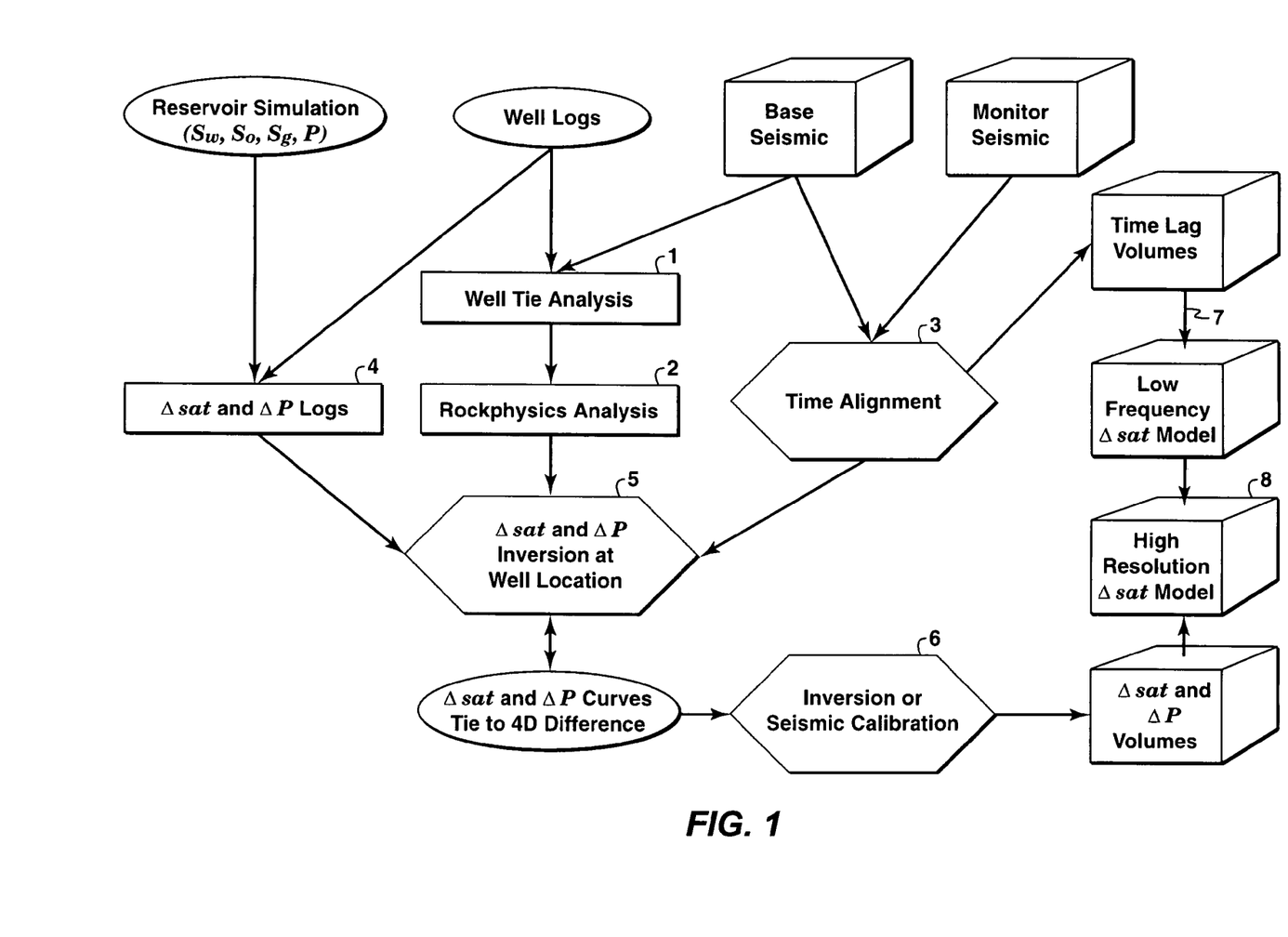
FIG. 1 is a workflow chart for one embodiment of the present inventive method.

The present invention is a method for inferring (i.e., solving an inverse problem) the saturation and pressure change of a reservoir by combining the information from 4D seismic and time lag data volumes derived from the 4D seismic, well logs, and reservoir simulation results (when simulator results are available) and featuring one or more 4D well ties for a quantitative 4D interpretation. The inventive method is model-based incorporating rock physics at well locations, and is statistical-based away from wells. The method thus allows integration of rock physics model and reservoir simulation and honors 4D seismic change. FIG. 1 is a flow chart showing major steps in the workflow in one embodiment of the present invention. In step 1, well log data are used to correlate (or tie) events indicated in data from a nearby seismic line with subsurface information provided by the well log. This step is particularly useful, for example, where subsurface layers dip rather than lie parallel to the surface. At step 2, rock physics analysis provides values derived from well logs of petrophysical parameters needed for the inversion process—primarily the elastic parameters (P-wave velocity, shear-wave velocity, and density) in relationship to the shale volume fraction (vshale or vsh) and the porosity, with the values valid at least in the vicinity of the well. In step 3, the monitor survey data are aligned with base seismic data by applying a volume of time correction factors (i.e. time lag or time shift). Steps 1, 2 and 3 are standard steps, well known in the art.

At step 4, the number of saturation variables is reduced to simplify the inversion step to come. Pressure change ($\Delta P$) is simply the result of subtraction of monitor reservoir pressure from base reservoir pressure. However, saturation change is a bit more complicated. Saturation includes three separate saturation measurements: gas saturation ($S_g$), oil saturation ($S_o$) and water saturation ($S_w$). These three quantities always satisfy the condition of $S_g+S_o+S_w=1$. In other words, these quantities are interlinked. To infer saturation change from 4D seismic in a preferred embodiment of the present invention, a single quantity is constructed to represent the changes in all three saturations. It is known that oil saturation rarely increases and that an increase of gas saturation causes a decrease in P-impedance, whereas an increase in water saturation causes an increase in P-impedance. (A P-wave is the primary seismic wave in seismic exploration, and is defined by particle motion in the direction of wave propagation.) Accordingly, the saturation change $\delta-Sat$ may be approximated by:

$$\delta-Sat=-\delta S_g+d*\delta S_w$$

where d is a correction factor determined by the relative impact of gas versus water on P-impedance, which can be determined through the exercise of Gassmann fluid substitution of oil with brine and gas, separately, and * denotes the multiplication operation. When $\delta-Sat$ is negative, this corresponds to an oil saturation decrease and a gas saturation increase; and when $\delta-Sat$ is positive, this corresponds to an oil or gas saturation decrease and a water saturation increase.

Current mature seismic calibration technology, either volume-based or map-based, deals with one property at a time. The $\delta-sat$ of the present invention combines the internal dependency of three saturation changes (gas, oil and water), which makes the seismic calibration for saturation change practical.

At step 5, model-based inversion is performed at well locations. In other words, saturation and pressure curves are derived by model based-inversion to improve the 4D well tie. The inversion is to find best compromise values for a $\Delta sat$ and a $\Delta P$ data volume for fitting to 4D difference data and constrained by simulation results (if available) for $\Delta sat$ and $\Delta P$ based on well log information and a rock physics model. This step is explained in more detail next. One difference between the present inventive method and a published method such as U.S. Pat. No. 5,798,982 to He et al. is that while He teaches inversion of 4-D seismic data, He inverts to obtain acoustic impedance and then derives oil saturation from the impedance data. He does not directly obtain saturation change from inversion of 4-D seismic data as does the present inventive method.

There are several advantages in conducting fluid- and pressure-change inversion at well locations: (a) rock physical properties, as well as elastic properties are best known at well locations; (b) production data and pressure measurements are available only at well locations; and (c) saturation and pressure changes from reservoir simulation are most reliable at well locations. The aforementioned paper by Veire et al. does not teach to conduct inversion at well locations. Further, Veire uses rock physics relationships to develop a stochastic model rather than the present invention's approach of establishing the statistical relationship by directly correlating the inverted saturation and pressure change results with the 4-D seismic data at well locations.

In one embodiment of the invention, the inversion scheme involves optimizing the following objective function:

$$f = \sum_i (D(m_i) - d_i)^2 + \lambda_1 * \sum_i (m_i - m_{i-1})^2 + \lambda_2 * \sum_i (m_i - r_i)^2 \quad (1)$$

where $m_i$=model saturation and pressure change, d=4D data, and $r_i$=reservoir simulation saturation and pressure changes, and the index i is over each discrete depth interval into which the well has been divided for numerical computation purposes. D(m) is the 4D seismic data calculated from the model saturation change. (The term 4D data means a 3D data volume of differences in seismic amplitude or some seismic attribute between surveys conducted at different times, time being the $4^{th}$ dimension in this terminology.) The $\lambda_i$ are scaling parameters to balance the terms in the objective function.

The first term is a fit to 4D data; the second term controls the smoothness of inverted results; and the third term is a fit to reservoir simulation results. When there is no reservoir simulation available, the following objective function may be used:

$$f = \sum_i (D(m_i) - d_i)^2 + \lambda_1 * \sum_i (m_i - m_{i-1})^2 + \lambda_2 * \left[\sum_i (m*(1-vsh)*\phi) - \delta v\right]^2 \quad (2)$$

where $\delta v$ is the ratio of produced gas-to-oil or water-to-oil. The third term is to match the produced portions of liquids (water, gas and water). Skilled readers will be able to devise other choices for the objective functions above.

Next, a way to represent the objective function as a set of linear equations will be given. If it is assumed that P-wave velocity ($V_p$), S-wave velocity ($V_S$), and density ($\rho$) are known values of those elastic parameters before production began, the reflectivity as a function of angle ($\theta$) for the base seismic survey can be written as follows (see Stolt and Weglein, "Migration and inversion of seismic data," *Geophysics* 50, 2458-2472 (1985) and the previously cited Aki & Richards 1980 reference):

$$Ref(t, \theta) = \frac{1}{2}(1 + \tan^2\theta)\frac{\partial}{\partial t}\ln V_p(t) - 4\frac{\overline{V}_s^2}{\overline{V}_p^2}\sin^2\theta\frac{\partial}{\partial t}\ln V_s(t) + \frac{1}{2}\left(1 - 4\frac{\overline{V}_s^2}{\overline{V}_p^2}\sin^2\theta\right)\frac{\partial}{\partial t}\ln\rho(t) \quad (3)$$

Seismic data are obtained by convolving the reflectivity with a wavelet. This can be written as a set of matrix equations:

$$[\text{Wavelet}]\begin{bmatrix}\text{Aki \& Richards}\end{bmatrix}[\text{Derivative}]\begin{bmatrix}\ln V_p \\ \ln V_s \\ \ln \rho\end{bmatrix} = [\text{base}] \quad (4)$$

that can be rewritten simply as a single matrix "G":

$$[G]\begin{bmatrix}\ln V_p \\ \ln V_s \\ \ln \rho\end{bmatrix} = [\text{base}] \quad (5)$$

After production, for an incremental change of pressure and saturation, the effect of saturation change on shear wave and effect of pressure on density may both be considered negligible, resulting in:

$$d\ln V_p \approx A_p * dsat + B_p * dp$$

$$d\ln \rho \approx A_\rho * dsat + 0 * dp$$

$$d\ln V_P \approx A_P * dsat + B_P * dp$$

$$d\ln V_s \approx 0 * dsat + B_s * dp$$

$$d\ln \rho \approx A_\rho * dsat + 0 * dp \quad (6)$$

Gassmann fluid substitution and an empirical relationship may be used to derive the Coefficients $A_P$, $B_P$, $B_S$ and $A_\rho$ (see Appendix). For monitor seismic data:

$$[G]\begin{bmatrix}\ln V_p + d\ln V_p \\ \ln V_s + d\ln V_s \\ \ln \rho + d\ln \rho\end{bmatrix} = [\text{Monitor}] \quad (7)$$

Therefore $$[G][A]\begin{bmatrix}dsat \\ dp\end{bmatrix} = [\text{Monitor} - \text{base}]. \quad (8)$$

Where $$A = \begin{bmatrix}A_P & B_P \\ 0 & B_s \\ A_\rho & 0\end{bmatrix}.$$

As will be well understood by practitioners in the field, the inversion uses an iterative process with each inversion step to solve for incremental improvement of goodness of fit.

It was found that it is typically most stable to directly apply the present inventive method to the 4D difference data rather than separately inverting monitor data and base data and then comparing. For objective function based inversion, a damped least-squares formalism may be used to solve the linearized set of equations. This involves appending two sets of damping matrices below the G*A matrix in equation (8). The first set of damping parameters control smoothness of the solution, which are differential operators across the diagonal. The second set of damping parameters are for fitting to the reservoir simulation. The damping matrix and associated portion of the data vector are multiplied by coefficients that are determined by a series of tests in which the coefficients are varied. The optimal damping parameters are chosen and the resulting matrix has the following form:

$$\begin{bmatrix} G*A \\ \lambda_1*D \\ \lambda_{2s}*I_1 \\ \lambda_{2p}*I_2 \end{bmatrix} \begin{bmatrix} dsat \\ dp \end{bmatrix} = \begin{bmatrix} \text{difference} \\ 0 \\ \text{dsat\_res} \\ \text{dp\_res} \end{bmatrix} \quad (9)$$

with $$D = \begin{bmatrix} \cdots & & \\ -1 & 1 & \\ & -1 & 1 \\ & & \cdots \end{bmatrix},$$

$I_1=[I\ 0]$, $I_2=[0\ I]$ and I is an identity matrix.

With appropriate choices of λ, this particular parameterization produces a solution that improves the fit to 4D data by honoring the reservoir simulation and a smooth change of saturation and pressure.

For the subsequent iteration of the inversion, the following form may be used:

$$\begin{bmatrix} G*A \\ \lambda_1*D \\ \lambda_{2s}*I_1 \\ \lambda_{2p}*I_2 \end{bmatrix} \begin{bmatrix} ddsat \\ ddp \end{bmatrix} = \begin{bmatrix} \text{seismic } \textit{diff} - \text{modeled } \textit{diff} \\ 0 \\ 0 \\ 0 \end{bmatrix} \quad (10)$$

where ddsat and ddp are incremental updates to dsat and dp. Three to four iterations are in general enough to obtain a converged solution.

After saturation and fluid change inversions are completed at well locations, pressure and saturation change away from well locations can be obtained (step 6) through either one of at least two approaches. The first approach is using the rock physics and inversion parameters derived at well locations to conduct fluid and pressure change inversions at pseudo-well locations. This approach requires a high confidence about the rock properties (i.e. vsh and porosity) inverted from seismic data at pseudo-well locations. The second approach is to use statistical calibration, such as multivariate linear regression or neural networks, to extrapolate away from well locations. Inverted saturation and pressure changes at well locations are calibrated to 4D seismic differences from different offsets. This approach requires wells used for calibration covering the rock property variations at reservoir.

In step 7, a low-frequency saturation change model is generated from time lag data volumes. (Before the time lag volumes are generated, a standard 4D seismic step is performed to align the time scales for the base seismic data and the monitor seismic data. This is shown in FIG. 1 as step 3. The time alignment is also required for step 5.)

In one embodiment of step 7, let $T_{lag}$ be the time lag required to shift the monitor survey to align it with the base survey at time t. It was found that the derivative of the time lag data volume is an approximation of the instant relative velocity change (δv/v) between monitor and base when there is no significant compaction within the reservoir:

$$\frac{dT_{lag}}{dt} \approx \frac{\delta v}{2v} \quad (11)$$

where $\delta v = v_m - v_b$, $v_m$=velocity at the time of the monitor survey and $v_b$=base survey velocity. For P-impedance ($I_P$): $I_P = v*\rho$; therefore, $$\frac{\delta I_P}{I_P} = \frac{\delta v}{v} + \frac{\delta \rho}{\rho} \quad (12)$$

On the assumption that the density contribution is small compared to the velocity contribution:

$$\delta I_P = I_P * \frac{\delta v}{v}.$$

Substitution of equation 11 into the last equation yields the time-lag based impedance change. $\delta I_P$, the impedance change, is in the same domain as the amplitude difference, i.e. both are a measure of reflection strength. When an inversion is not available, integrated absolute seismic trace amplitude ($I_{AA}$) may be used as a replacement of $I_P$. The potential applications of time-lag based impedance are many, including: (a) to provide a low-frequency model for difference-based inversion; (b) to modify the base survey low-frequency model for improved monitor impedance inversion; and (c) to display as a cross-plot with the amplitude-based impedance change for improved 4D reservoir characterizations.

The low frequency model may be created by calibrating the low-filtered saturation change logs, which were derived in step 5 with a similarly low-pass filtered $\delta I_P$ volume.

In step 8, the low frequency model may be merged with a band-limited saturation change volume derived from the calibration step to get a high-cut saturation volume; i.e. the two data volumes are added together after making sure there is little overlap of the information in frequency domain. The merged volume improves correspondence to the water/gas movement and accuracy of the saturation change predication, as indicated by the results in Table 1.

Inverted saturation and pressure change can be used to more rigorously constrain the reservoir simulation model or as target logs for statistical calibration to extrapolate away from wells, as is done in the example that follows.

EXAMPLE

Figure 2:
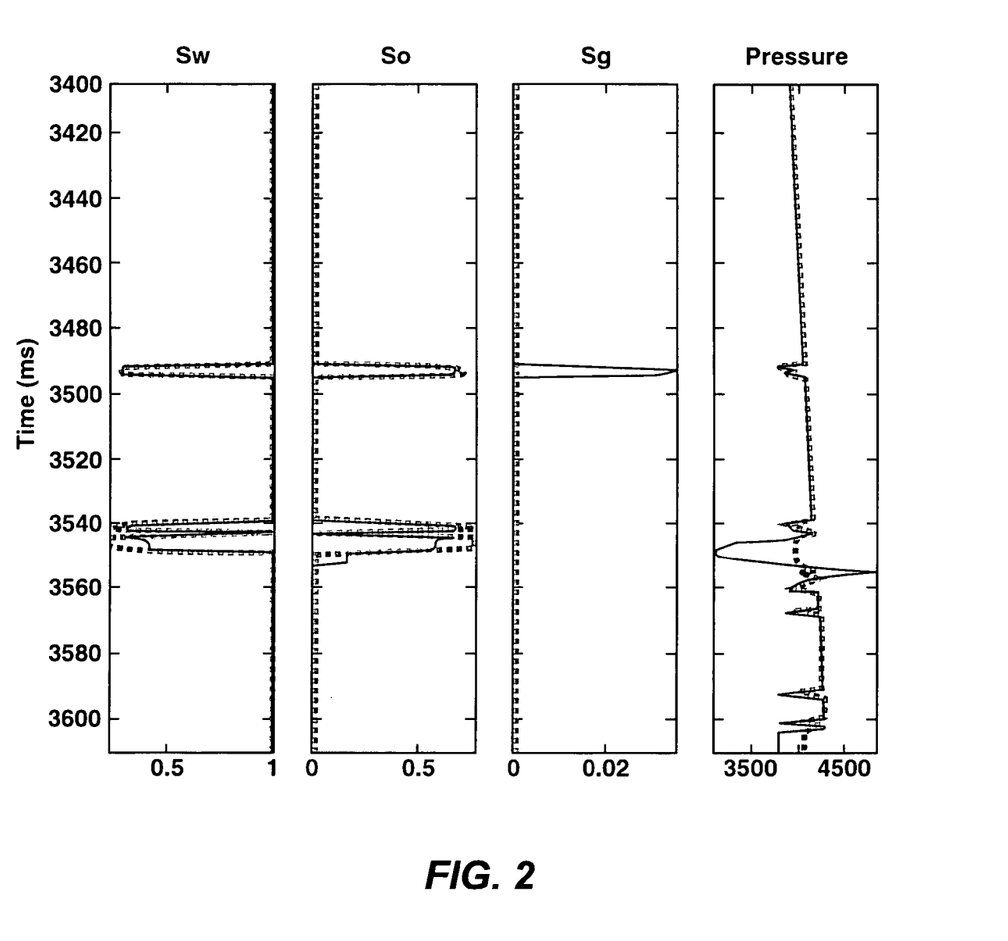
FIG. 2 shows inverted (using the present inventive method) saturation and pressure curves for monitor survey data (solid lines) versus corresponding curves for base survey data (dashed lines), wherein the first track is water saturation, the second track is oil saturation, the third track is gas saturation, and the fourth track is reservoir pressure.
Figure 3:
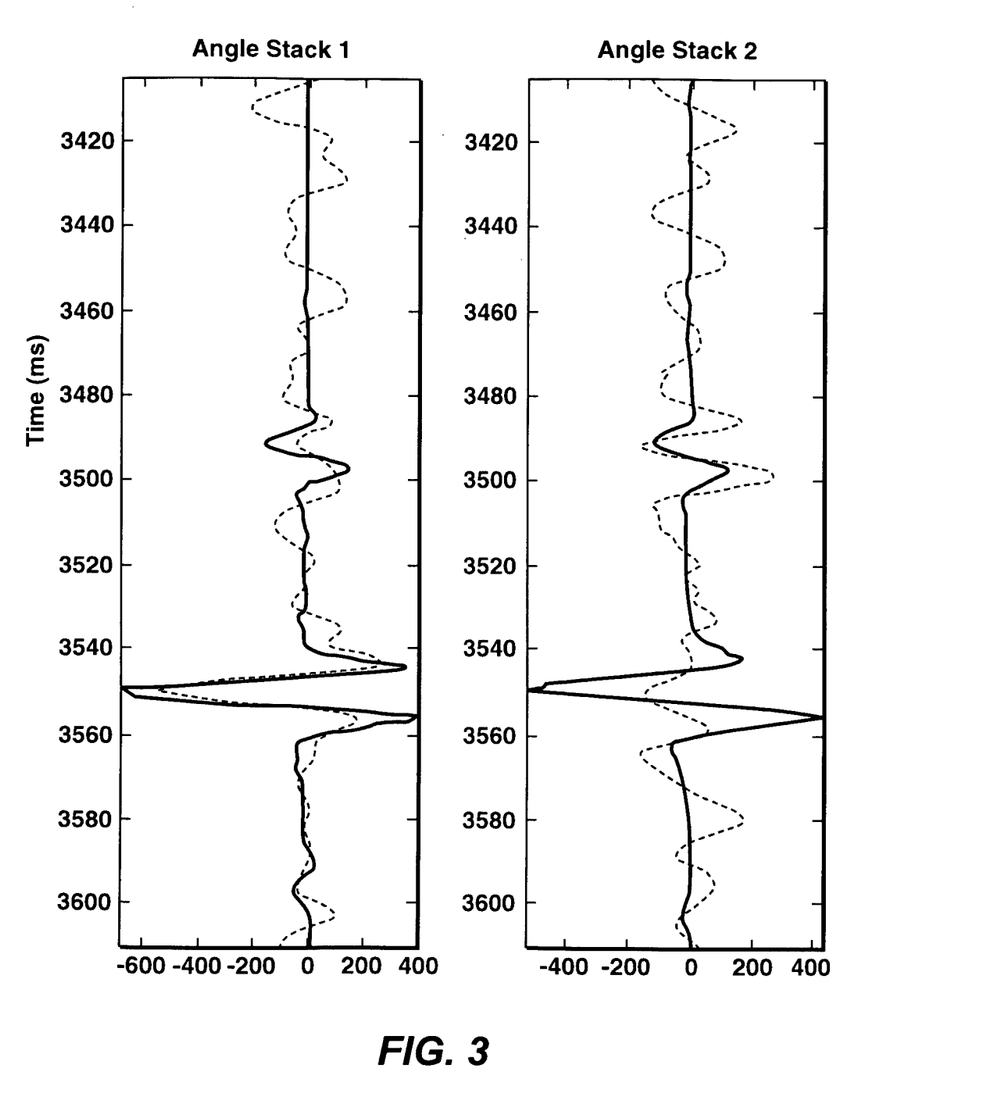
FIG. 3 shows synthetic 4D seismic difference (solid lines), using a model based on inversion results of the present inventive method, versus actual 4D differences (dashed lines), wherein the first track is near angle stack and the second track is far angle stack.

The present inventive method was applied to a deepwater field where gas and water injection is used for both pressure maintenance and gas storage. Monitoring the gas and water movement is the main objective of 4D surveillance at this field. FIG. 2 shows the inverted saturation and pressure change curves at a well location. The solid lines correspond to the monitor survey, and the dashed lines the base survey. FIG. 3 plots synthetic 4D seismic difference (solid lines) versus actual 4D differences (dashed lines). The first track is a near angle stack and second track is a far angle stack. FIG. 3 shows that the fluid and pressure change inversion of the present invention (solid lines) is able to match actual differences very well for the near angle stack, and less well for the far angle stack (to be expected because of factors such as uncertainties in NMO stretch and more Q attenuation).

Figure 4:
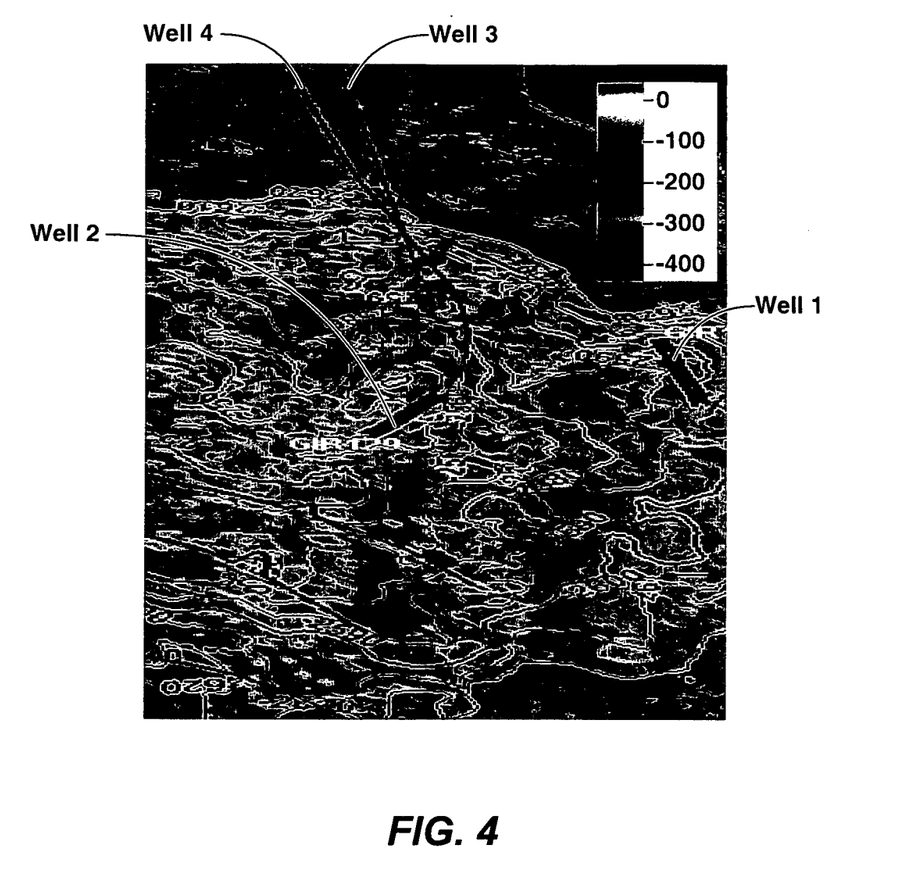
FIG. 4 shows (black and white reproduction of a color display) inverted pressure change at the same reservoir represented in FIGS. 2-3, the inversion by the present inventive method.

Using inverted logs at this field as target logs, the commercial software product Emerge (http://www.veritasdgc.com/vhr/bins/index.asp) was used to calibrate 4D seismic to saturation and pressure change. Both near and far difference volumes are among the input volumes. As FIG. 4 shows for ΔP and Table 1 shows for saturation, the resultant pressure and saturation show good conformance to geological expectations and consistency with reservoir simulations. FIG. 4 is a black and white reproduction of a colored data display where the color scale represents numerical values of ΔP.

TABLE 1

| Volumes | Correlation (R) | Error |
|---|---|---|
| Far angle stack | 0.20 | 0.102 |
| Bandlimited Saturation volume from inversion | 0.32 | 0.096 |
| Merged Saturation Volume | 0.78 | 0.066 |

The fluid saturation and pressure change versus depth results can be used to improve the history match in reservoir simulation, i.e. to provide added constraint on the reservoir simulation model.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will recognize that at least some of the steps of the invention are performed on or with the aid of a computer, i.e. the invention is computer implemented in its preferred embodiments. In such instances, the resulting pressure and saturation changes may be either downloaded or saved to computer memory.

Appendix

To derive the coefficients in equation (6), it is assumed that pressure change and saturation change affect the elastic parameters ($V_P$, $V_S$ and $\rho$) independently. The coefficients for saturation and pressure are derived using separate equations:

Saturation Change

The effect of saturation change on shear velocity is ignored. For P-velocity:

$$V_p = \sqrt{\frac{K + 4/3\mu}{\rho}} \tag{A1}$$

Only bulk modulus (K) and density ($\rho$) vary when saturation changes, therefore $$d\ln V_p = \frac{1}{V_p}\left(\frac{dV_p}{dK}dK + \frac{dV_p}{d\rho}d\rho\right) \tag{A2}$$

$$= \frac{1}{2V_p^2 \rho}(dK - d\ln\rho)$$

and $d\ln(\rho) = 1/\rho d\rho$ \hfill (A3)

From equation (A3) and the following two equations:

$$\rho = (1-\phi)\rho_s + \phi\rho_f \text{ and } \rho_f = \rho_o S_o + \rho_g S_g$$

where $\rho_s$ is the density for solid rock, $\rho_f$ is the density for mixed fluid, $\rho_o$ is the density of in-situ oil and $\rho_g$ is the density of in-situ gas, one then has:

$$d\ln\rho = \frac{\phi(\rho_o - \rho_g)}{\rho}dsat \tag{A4}$$

Here, only a two-fluid system of gas-oil will be considered because the correction factor d in equation (1) is designed to account for water replacing oil.

Hence, $$A_\rho = \frac{\phi(\rho_o - \rho_g)}{\rho}$$

To express dK in terms of dsat, one may start with the Gassmann equation:

$$\frac{K_{satA}}{k_s - K_{satA}} - \frac{K_{fluidA}}{\phi(K_s - K_{fluidA})} = \frac{K_{satB}}{K_s - K_{satB}} - \frac{K_{fluidB}}{\phi(K_s - K_{fluidB})} \tag{A5}$$

Assume $k = K_{satA}$ and $k_f = K_{fluidA}$; for the rock frame with fluid B, one has $K_{satB} = k + dk$ and $K_{fluidB} = k_f + dk_f$. After plugging these definitions into equation (A5) and neglecting small terms, one gets:

$$dk = \frac{(K_s - K)^2}{\phi(K_s - K_f)^2}dk_f \tag{A6}$$

Similar to density, a two-fluid system is used to express $dk_f$ in terms of dsat. For a Reuss average mixing scheme:

$$\frac{1}{K_f} = \frac{S_g}{K_g} + \frac{S_o}{K_o} \tag{A7}$$

One finds:

$$dK_f = \frac{K_f^2(K_o - K_g)}{K_o K_g}dsat \tag{A8}$$

By substituting equations (A8), (A6) and (A4) into (A2), one gets:

$$d\ln V_p = \frac{1}{2V_p^2 \rho}\left(\frac{(K_s - K)^2 K_f^2(K_o - K_g)}{\phi(K_s - K_f)^2 K_o K_g} - \frac{\phi(\rho_o - \rho_g)}{\rho}\right)dsat \tag{A9}$$

Hence, $$A_p = \frac{1}{2V_p^2 \rho}\left(\frac{(K_s - K)^2 K_f^2(K_o - K_g)}{\phi(K_s - K_f)^2 K_o K_g} - \frac{\phi(\rho_o - \rho_g)}{\rho}\right)$$

Pressure Change

The pressure effect on density will be ignored, and empirical relationships will be used for $V_P$ and $V_S$. For $V_P$ in terms of pressure P, $$V_p = V_{p_\infty}(1 - Ae^{-P/P_0}) \quad (A10)$$

A and $P_0$ are constants, which are generally determined from core measurements. By taking the logarithm and the derivative relative to P, one gets $$d\ln V_p = \frac{Ae^{-p/P_0}}{p_0(1 - Ae^{-p/P_0})} dp \quad (A11)$$

Hence, $$B_P = \frac{Ae^{-P/P_0}}{P_0(1 - Ae^{-P/P_0})}$$

Similarly for shear velocity $V_S$, one has $$B_s = \frac{A_s e^{-P/P_{s0}}}{P_{s0}(1 - A_s e^{-P/P_{s0}})}$$

The invention claimed is:

1. A method for inversion of time-lapse (4D) seismic data (a base survey and a later monitor survey of the same subsurface formation) to estimate the change in fluid saturation and reservoir pressure from the time of the base survey to the time of the monitor survey, comprising:
   (a) at at least one well location, inverting the 4D seismic data in a single iterative inversion process to directly obtain formation pressure change and fluid saturation change versus for at least one formation fluid, constraining the inversion with well log data, wherein the inversion is model-based and incorporates rock physics in the model, and the model is a 1D model showing variation as a function of depth; and
   (b) using the saturation and pressure change from at least one well location to obtain saturation and pressure change away from well locations, thereby generating a well-tied fluid saturation and pressure change model predicting change of fluid saturation from the time of the base survey to the time of the monitor survey.

2. The method of claim 1, further comprising
   (c) constructing a low-frequency saturation-change model from time-lag data obtained from the time-lapse seismic data, said time lag being the time shift required to shift the monitor survey data to align with the base survey data; and
   (d) merging the low-frequency saturation-change model with the well-tied saturation and pressure change model to obtain a high resolution model predicting change of fluid saturation from the time of the base survey to the time of the monitor survey.

3. The method of claim 2, wherein the low-frequency saturation-change model is constructed from time-lag data by assuming that the time derivative of the time lag data is proportional to the fractional change $\delta v/v$ in acoustic wave propagation velocity from monitor to base survey times.

4. The method of claim 3, wherein the low-frequency saturation-change model is constructed from time-lag data by further steps comprising:
   (i) forming a $\delta v/v$ data volume corresponding to at least a portion of the subsurface formation;
   (ii) filtering the $\delta v/v$ data volume with a low-pass filter;
   (iii) multiplying the $\delta v/v$ data volume location-by-location by an impedance or impedance-equivalent attribute volume from the base survey data; and
   (iv) calibrating the resulting data volume from the previous step with low frequency saturation logs from 4D inversion at well locations to obtain a low-frequency saturation change data volume.

5. The method of claim 4, wherein the impedance-equivalent attribute is integrated absolute seismic amplitude.

6. The method of claim 1, wherein the saturation and pressure change inversion at well locations are constrained by reservoir simulator predictions of the saturation and pressure changes.

7. The method of claim 1, wherein the well log data are used in a rock physics analysis to generate subsurface parameters including at least shale volume fraction and porosity, said parameters being used in the step (a) inversion.

8. The method of claim 1, wherein the step (a) inversion involves optimizing an objective function measuring goodness of fit between measured 4D seismic data and 4D seismic data calculated based on a model value of fluid saturation change.

9. The method of claim 1, wherein saturation and pressure change away from well locations is obtained by using parameters derived at well locations to perform fluid saturation and pressure change inversions at pseudo-well locations.

10. The method of claim 1, wherein saturation and pressure change away from well locations is obtained by using statistical calibration of inverted saturation and pressure changes to 4D seismic data differences, said calibration being done at one or more well locations.

11. The method of claim 10, wherein the statistical calibration is performed using a neural network.

12. The method of claim 10, wherein the statistical calibration is performed using linear regression.

13. The method of claim 1, wherein fluid saturation consists of an oil saturation value, a gas saturation value, and a water saturation value for a plurality of locations in the subsurface formation.

14. The method of claim 13, wherein fluid saturation change is approximated by a single variable, constructed to represent all three (oil, gas and water) saturation measurements, in order to simplify the inversion step.

15. The method of claim 14, wherein the single saturation change variable $\delta$–Sat is given by:

$$\delta\text{-}Sat = -\delta S_g + d^*\delta S_w$$

where $\delta S_g$ and $\delta S_w$ represent change in gas saturation and water saturation, respectively, and recognizing that $S_g$, $S_w$ and oil saturation $S_o$ must obey the relationship $S_g + S_o + S_w = 1$.

16. A method for producing hydrocarbons from a formation in a subsurface region, comprising:
   (a) conducting a base seismic survey of the subsurface region, and a later monitor survey of the same subsurface region after hydrocarbon production from the formation has begun;
   (b) estimating the change in oil or gas saturation as a function of location in the formation from the time of the base survey to the time of the monitor survey using a method as described in claim 1, which description is incorporated herein by reference; and
   (c) using the estimated saturation change values to plan further production from the formation.

17. The method of claim 1, further comprising using the well-tied fluid saturation and pressure change model to manage development of hydrocarbon production from the subsurface formation.

* * * * *